Oct. 3, 1972   D. G. KEITH ET AL   3,695,959
METHOD OF MAKING SPIRAL WOUND PLASTIC FORM TUBE
Filed Feb. 16, 1970   2 Sheets-Sheet 1

INVENTORS
DONALD GEORGE KEITH
HORST EGON FRED LUDWIG MAACK
DOUGLAS BARRETT MORRIS

BY
Cushman Darby & Cushman
ATTORNEYS

Oct. 3, 1972    D. G. KEITH ET AL    3,695,959
METHOD OF MAKING SPIRAL WOUND PLASTIC FORM TUBE
Filed Feb. 16, 1970    2 Sheets-Sheet 2
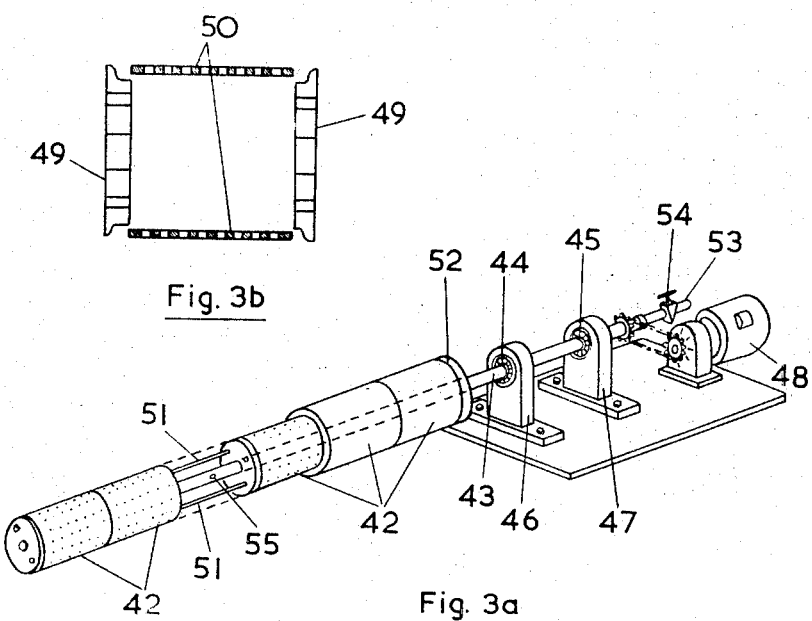
Fig. 3b
Fig. 3a
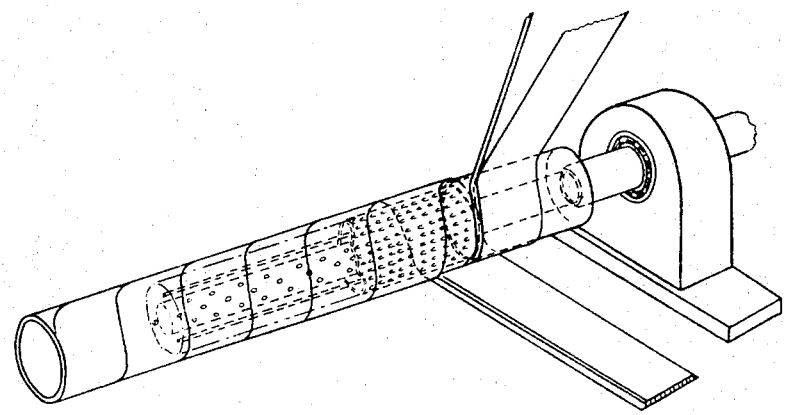
Fig. 4
INVENTORS
DONALD GEORGE KEITH
HORST EGON FRED LUDWIG MAACK
DOUGLAS BARRETT MORRIS
BY Cushman, Darby & Cushman
ATTORNEYS

United States Patent Office 3,695,959
Patented Oct. 3, 1972

3,695,959
METHOD OF MAKING SPIRAL WOUND PLASTIC FORM TUBE
Donald George Keith, Billingham, and Horst Egon Fred Ludwig Maack and Douglas Barrett Morris, Runcorn, England, assignors to Imperial Chemical Industries, Limited, London, England
Filed Feb. 16, 1970, Ser. No. 11,430
Claims priority, application Great Britain, Feb. 25, 1969, 9,957/69
Int. Cl. B32b 5/18
U.S. Cl. 156—79
11 Claims

ABSTRACT OF THE DISCLOSURE

A method of forming spirally wound tube having at least one annular layer of foamed plastic which comprises (a) successively supplying tangentally to a mandrel and at an angle of less than 90° to the longitudinal axis thereof two or more plies at least one of which bears a coating of at least one fluid foamable plastic composition which may be in an at least partly expanded state, the order of succession and the manner of offering the plies to the mandrel being such that the foamable plastic composition lies between two plies on the mandrel, (b) rotation or lapping the plies round the mandrel to form ply windings thereon and simultaneously axially progressing the resultant ply windings along the mandrel whereby a spirally wound tube is formed, (c) causing or allowing the foam composition to complete its expansion and to set, and (d) supporting the spirally wound tube on the mandrel until the foam is sufficiently set for the tube to be self-supporting. Machinery for carrying out the method is also disclosed.

---

Figure 1:
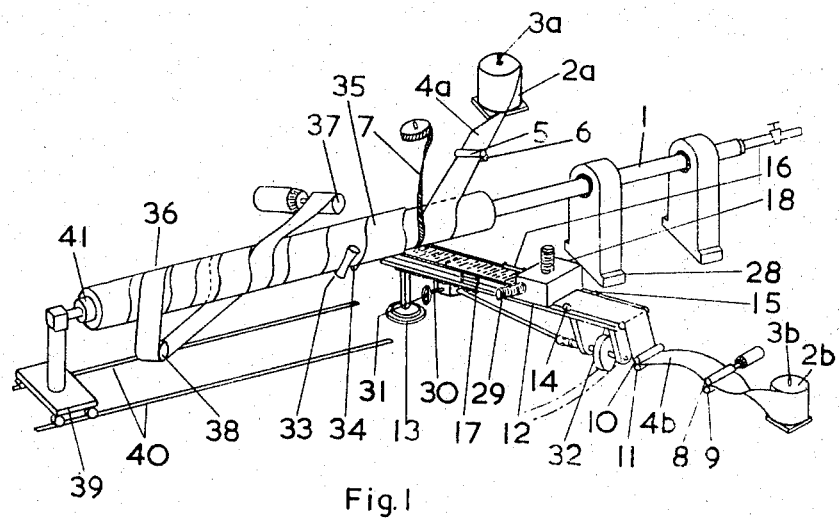

This invention relates to the production of spirally wound tube with an annular plastic foam layer. In particular, it relates to the direct production of tube from flexible ribbon and fluid nascent plastic foam composition.

Various methods have already been proposed for producing spirally wound tube with an annular foam layer from flexible ribbon and fluid nascent plastic foam.

According to one method, the nascent foam composition is continuously introduced into the space left between the faces of two travelling ribbons arranged one on top of the other, and the laminate so formed is continuously fed tangentially on to and round a mandrel and at an angle of less than 90° to the axis thereof to form a spirally wound structure. It will be appreciated, however, that in the operation of this method the ribbon ultimately forming the outer surface of the spirally wound structure has to encompass a greater circumference than the ribbon forming the inner surface. This may only be accomplished by allowing the outer ribbon to stretch or to travel faster than the inner ribbon. In either case, the fluid foaming composition is subjected to compressive and/or shear forces while it is expanding and setting thus damaging the cell structure of the foam, and, since even slight damage to the cell structure can result in drastic reductions in compressive strength and other physical properties, it will be appreciated that the production of spirally wound articles having optimum physical properties is hardly possible. There are also other problems involved with this method, such as sealing the join between axially adjacent helices and avoiding the development of a helical line of weakness at the join.

In accordance with another method, a first ribbon is fed tangentially on to and round a mandrel at an angle of less than 90° to the axis thereof to form a spirally wound base structure, fluid nascent foam is deposited on the surface of this spirally wound structure and a second ribbon is spirally wound on top. In practice, however, it is very difficult, if not impossible, to obtain products of consistently uniform cross-section because of the tendency of the foam composition to flow under the influence of gravity before it sets. Even if it proves possible to deliver the nascent foam at the necessary consistency to avoid flow, a small change in ambient temperature during running may be sufficient to change the consistency and upset the equilibrium.

We have now found a method of producing spirally wound products with an annular foam layer from fluid nascent foam and flexible ribbon which allows the above disadvantages to be avoided, or their effect to be reduced, requires simple and inexpensive apparatus, and is easy to control.

According to the present invention, we provide a method of forming spirally wound tube having at least one annular layer of foamed plastic which comprises:

(a) Successively supplying tangentially to a mandrel and at an angle of less than 90° to the longitudinal axis thereof two or more plies at least one of which bears a coating of at least one fluid foamable plastic composition which, if desired, may be in an at least partly expanded state, the order of succession and the manner of offering the plies to the mandrel being such that said foamable plastic composition lies between two plies on the mandrel, (b) Rotating or lapping said plies round the mandrel to form ply windings thereon and simultaneously axially progressing the resultant ply windings along said mandrel whereby a spirally wound tube is formed, (c) Causing or allowing the foam composition to complete its expansion and to set, optionally by means of applied heat, and (d) Supporting the spirally wound tube on the mandrel until the foam is sufficiently set for said tube to be self-supporting.

It will be understood that the action of rotating a portion of already formed spirally wound structure about the mandrel axis and axially advancing it along the mandrel will itself cause the plies which are supplied to the mandrel to be helically or spirally lapped about it at the rear of the already formed portion.

Most preferably, each ply is fed onto the mandrel out of register with the previous ply so as to avoid the possibility of developing a helical line of weakness. The product thus formed is a tube whose wall contains a layer of spirally wound ply and an adjacent layer of spirally wound plastic foam coated ply, the adjacent layer being out of register with the first layer.

In accordance with a much preferred embodiment of the invention, the foamable composition is deposited on to the surface of the ply with said surface in the horizontal plane or substantially so and said surface is maintained in the substantially horizontal plane while the foam completes at least some of its expansion and hardening (e.g. curing), thus aiding the production of good quality foam. However, it is preferred that not all of the expansion and hardening is complete before the foam coated ribbon is fed on to the mandrel.

Preferably, the foamable composition is deposited on the second or a later ply and the coated ply is guided on to the mandrel with the foam in the nip between itself and the previous ply.

Thus, in accordance with a very much preferred embodiment of the invention, the process comprises supplying a first ply tangentially to a mandrel and at an angle of less than 90° to the longitudinal axis thereof, rotating or lapping said ply round the mandrel to form ply windings thereon, simultaneously axially progressing the ply windings along the mandrel and bonding together axially adjacent windings of said ply to form a spirally wound inner, moving a second ply past foam dispensing means with its surface in a substantially horizontal plane and depositing a layer of fluid foamable plastic composition thereon, causing or allowing the foam to complete some but not all of its expansion and hardening while maintaining said ply surface substantially horizontal, feeding said foam-coated ply tangentially and at an angle of less than 90° to the axis thereof on to the spirally wound structure being formed from the previously wound ply and out of register therewith with the foam in the nip between the plies, rotating or lapping said foam-coated ply around the mandrel at the same rate as the previous ply and axially progressing the windings along the mandrel at the same rate as the previous ply, causing or allowing the foam to complete its expansion and to set, optionally by means of applied heat, and supporting the spirally wound product on the mandrel until the foam is sufficiently hardened for it to be self-supporting.

In order to reduce the danger of the spirally wound structure seizing on the mandrel, for example due to compression of the innermost ply as a result of expansion of the foam, it is also preferred that some means of lubrication, and preferably a gas cushion, are provided between the mandrel and the ply windings, said gas cushion extending for at least part of the length of the mandrel forward from the tail (or supported) end thereof, i.e. the end of the mandrel from which the spirally wound structure is withdrawn. It is particularly advantageous for an air cushion to be provided between the tube and the mandrel at least for the entire length of the mandrel rearward (i.e. towards the tail) of a position lying between the point where the nip is formed between the leading edge of the, or the first, foam coated ply and the previous ply or plies and the point where the leading edge of the, or the first, foam coated ply has completed one full revolution round the mandrel axis. However, it may be undesirable, especially where the previous ply or plies are of very thin and easily flexed material such as, for example, paper or plastic film, for the air cushion to project forward (i.e. towards the head) of the point where the nip is formed between the trailing edge of the, or the first, foam coated ply and the previous ply or plies. By the leading edge of a ply, we mean that edge which is at the forward end of the tube as the tube is withdrawn from the mandrel, and correspondingly the trailing edge is at the rearward end of the tube as it is withdrawn.

Preferably, the longitudinal tension of each ply, or at least each foam-coated ply, is controlled as it is fed to the mandrel to provide an extra degree of control over the quality of the product. It may also be preferred to positively withdraw each ply, or at least each ply that is to be coated with foamable composition, from its point of supply, so as to reduce or avoid any backtension on the tension control means.

It may also be preferred to compensate for any difference in longitudinal tension that may arise between one edge and the other of each ply, or at least each foam-coated ply, as a result of feeding it at an angle to the mandrel. For example, that edge with the lower tension may be caused to travel further than the other edge.

The coated ply is preferably wound with overlap in order to achieve good bonding between adjacent axial ply windings and avoid exudation of the foam at the join. For this purpose, it is preferred to distribute the foamable composition over only part of the width of the ply leaving a strip adjacent to the leading edge substantially uncovered so that it may be used to form the overlap with the adjacent ply winding when the ply is wound on to the mandrel. In one method of effecting this, part of the width of the ply may be folded under the remainder before it reaches the foam dispensing means. Preferably, however, the foam dispensing means itself is controlled so as to leave such a strip uncoated. If desired, a very thin layer of foamable composition may be deposited on the strip (e.g. by overspray) to act as an adhesive.

In accordance with a further preferment, the temperature of the foamable composition deposited on the ply may be controlled, e.g. by pre-heating the ply before the foamable composition is deposited thereon and/or heating or cooling the composition after it is deposited thereon. The temperature may be controlled across, along or through the thickness of the foamable composition as desired. If desired, the spirally wound product may also be heated, e.g. to aid cure of the foam where this is based on a curable polymer composition.

In accordance with a further embodiment of the invention, we provide machinery for forming a composite tube as described, which machinery comprises in combination:

(a) A mounting, which supports
(b) A cantilevered mandrel,
(c) Means for successively supplying two or more plies of material to said mandrel,
(d) Means for guiding each ply tangentially on to the mandrel at a predetermined angle of less than 90° to the axis thereof,
(e) Means, situated along the path of at least one ply between said supply means and the mandrel, for depositing and distributing a controlled and predetermined quantity of a fluid foamable plastic composition over a predetermined width of said ply running past said foam depositing means,
(f) Means for rotating or lapping the plies around the mandrel to form ply windings thereon,
(g) Means synchronised with said rotating means for simultaneously axially progressing the ply windings along the mandrel to form a spirally wound structure, and
(h) Support and guide means for the spirally wound structure.

Preferably the mandrel reduces in cross-section between the head and the tail thereof. The reduction may be continuous or by means of a discontinuity or step.

In order to reduce the chance of the spirally wound structure seizing on the mandrel during its production, preferably the machinery includes means for providing lubrication, and especially a gas cushion, between the mandrel and the ply windings at least for part of the length of the mandrel forward from the tail, or unsupported, end thereof (i.e. the end of the mandrel off which the spirally wound structure is withdrawn). As mentioned hereinbefore, it is particularly advantageous for an air cushion to be provided between the tube and the mandrel at least for the entire length of the mandrel rearward (i.e. towards the tail) of a position lying between the point where the nip is formed between the leading edge of the, or the first, foam coated ply and the previous ply or plies and the point where the leading edge of the, or the first, foam coated ply has completed one full revolution round the mandrel axis.

In accordance with one suitable method of achieving this, the cantilevered mandrel comprises a head portion which is adapted to be adjacent the mounting and has an impermeable cylindrical wall; a tail portion which is coaxial with the head portion, is at the end thereof distant from the mounting and is of smaller diameter than the head portion, at least part of the length of said tail portion being of hollow cross-section and having a gas-permeable wall; and a conduit within the head portion adapted to connect the hollow part of the tail to a supply of compressed gas and the machinery also includes means for supplying compressed gas, e.g. air, to the mandrel.

In operation, the first ribbon to be fed on to and round the mandrel to form the spirally wound tube is guided on to the head portion and the ribbon windings are then progressed along the mandrel on to the tail portion where a cushion of gas under pressure is provided between the wall of the tail portion and the under surface of the spirally wound structure thus assisting its progression along the mandrel and off the tail. The head portion is impermeable so as to provide an accurate former for defining the internal diameter of the spirally wound structure and to allow the use of ribbons of flimsy material such as tissue paper or very thin plastic film which would be difficult to feed on against the counter-force of compressed gas. The tail portion is of smaller diameter than the head portion so as to provide an annular space for the gas cushion.

It is preferred that at least the head portion of the mandrel is rotatable about its longitudinal axis so as to reduce friction between this portion and the ribbon windings. If desired, the head may be power driven.

It is further preferred that the head and tail portions are each of substantially constant diameter, there being a step reduction in diameter between the head portion and tail portion which serves to define a regular annular gap of suitable size for the gas cushion between the tail portion and the inner surface of the spirally wound structure.

In accordance with an embodiment preferred for its simplicity, ease of assembly and dismantling, and flexibility of operation, the mandrel may be built up from the following assemblage of parts (i) a shaft adapted to be supported at one end (the head) in a mounting therefor, (ii) adapted to be assembled coaxially and in end-to-end relationship on said shaft two sets of hollow cylindrical units, each set being of substantially uniform diameter and comprising at least one unit, the two sets being of different diameter, the set of larger diameter being adapted to be mounted at the head of the shaft and having impermeable cylindrical walls and the set of smaller diameter adapted to be mounted at the tail of the shaft and having gas-permeable cylindrical walls, (iii) means adapted to connect the hollow interior of at least one unit of the smaller diameter set (and preferably at least that unit which is situated adjacent a unit of the larger diameter set on the shaft) with a supply of compressed gas, and (iv) means for rotating at least the units of the larger diameter set about their common axis.

It will readily be understood in respect of this preferred embodiment that by providing a number of sets of cylindrical units of different diameters to be mounted on the shaft, mandrels can rapidly be assembled for use in the production of spirally wound tubing of any desired diameter. Equally, mandrels of any desired length may be formed to suit any purpose required of them.

Preferably the hollow interior of each cylindrical unit of smaller diameter is connected to the supply of compressed gas by making the shaft hollow thereby providing a conduit within said shaft, providing one or more ports at suitable points along the conduit adapted to open into the hollow interior of at least one of the units of smaller diameter and providing means at the head end of the shaft for connecting the conduit to a supply of compressed gas. It is further preferred that the ports have adjustable orifices whereby the gas pressure at each port may be varied, thus providing for differential pressures along the length of the mandrel.

It is further preferred that the shaft is adapted to be rotatable in the mounting, and that at least the units of larger diameter are adapted to be fixedly mounted on said shaft to rotate therewith.

Reverting to the machinery as a whole, means may be provided for controlling the longitudinal tension of each ply, or at least each foam-coated ply, as it is fed to the mandrel. Means may also be provided for compensating for any difference in longitudinal tension that may arise between one edge of the foam-coated ply and the other. Conveniently, this may comprise means for lengthening the path that edge with the lower tension travels, e.g. by providing a bar or roller mounted under, across, and in contact with the lower surface of the ply, one end of the said bar or roller being adjustable vertically relative to the other end.

It may also be preferred for the machinery to contain means for positively withdrawing each ply, or at least each ply which is to be coated with foamable composition, from its supply means and feeding it to the tension means to maintain the back tension at zero or a very low level. Means for controlling the temperature of the foam coating on the ply along its length, across its width and/or through its depth may also be provided together, if desired, with means for controlling the temperature of the spirally wound structure, e.g. for controlling the cure of the foam where this is based on a curable polymer system.

In yet a further preferment, means are provided for adjusting the angle at which each foam coated ply is fed to the mandrel during the tube-forming process.

In one embodiment of this preferment, support means are provided for each foam coated ply, said support means being movable in a horizontal arc round the mandrel and lockable at any predetermined angle to the longitudinal axis of the mandrel, and being provided at a point distant from the mandrel with means for positively locating the ply on said support.

The support means preferably has attached thereto the foam dispensing means, optionally means for positively locating the ply as it passes under said foam dispensing means, and optionally temperature control means mounted intermediate the foam dispensing means and the mandrel. The temperature control means may, if desired, comprise a series of separate and individually controllable elements mounted parallel and/or normal to the line of travel of the ply, and above and/or below it.

The foam dispensing means may suitably comprise a reciprocating nozzle, movable forward and back across the width of the ply. Its travel may then be adjusted, where desired, to leave a strip adjacent one edge of the ply uncovered for overlap purposes. The position of the foam dispensing means relative to the mandrel along the path of the ply may also be adjustable.

Figure 2:
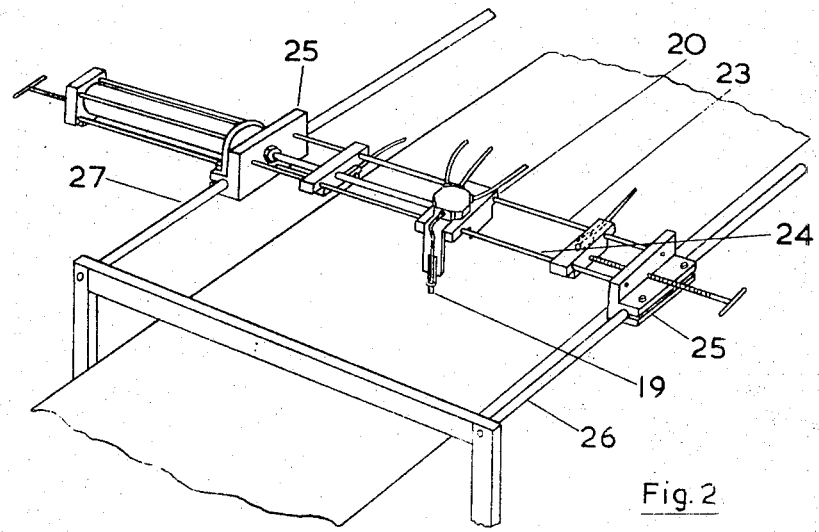

The invention is now described in more detail with reference to one embodiment thereof and with the aid of the accompanying drawings in which FIG. 1 is a perspective view of the machinery, FIG. 2 is an enlarged perspective view of the foam dispensing means used in the machinery of FIG. 1, FIG. 3a is an enlarged fragmentary cross-sectional view of the mandrel identified generally by reference numeral 1 in FIG. 1, with the interior partly exposed, FIG. 3b is an enlarged and exploded cross-sectional elevation of one cylindrical unit of the same mandrel, and FIG. 4 shows the preferred locations of the ply windings on the mandrel.

Referring to FIGS. 1 and 2, numeral 1 indicates generally a mandrel; 2a and 2b are rolls of ply, e.g. of paper, mounted on spindles 3a and 3b; two are shown but it will be understood that three or more may be used if desired. 4a and 4b are the plies being fed in the direction of the arrows. 5 and 6 are a pair of rollers which in operation guide the ply on to the mandrel and which if desired may be operated to control the tension of the ply 4a, e.g. by means of a dashpot. 7 is an adhesive tape which in operation is fed on to the abutted edges of the adjacent helices of the ply 4a as they are formed on the mandrel in order to attach axially adjacent helices together to form an integral spirally wound tube. 8 and 9 are driven rollers which in operation draw ply 4b off its storage roll and 10 and 11 are rollers adapted to supply the desired amount of tension in the ply 4b, e.g. by means of a dashpot.

12 is a table pivoted at 13 and carrying guide means 14, 15, 16, 17 adapted to locate the ply positively as it passes under the foam dispensing means situated in the housing 18. Referring to FIG. 2, the foam dispensing means suitably comprises a nozzle 19 mounted on a frame 20 adapted to reciprocate on first rails 23 and 24 and operably connected to a piston sliding in a cylinder and operated by air or hydraulic means controlled by valves actuated by microswitches located at each end of the desired travel of the frame. The rails are mounted on blocks 25 which slide on second rails 26 and 27 which are aligned with the longitudinal axis of the ply whereby the foam dispensing means can be moved along the longitudinal axis of the ply. Means (not shown) are provided for locking the blocks in any position on the rails. The foam dispensing means is mounted within the housing 18, FIG. 1, through which in operation the ply travels and from which in operation the vapours and overspray from the plastic foam composition are extracted through one or more vents 28, 29 by pumping means not shown. The vents are arranged to prevent build up of spray on the foam dispensing means, and especially on the rails 23, 24 on which the frame 20 is slidably mounted so as to avoid clogging of the moving parts.

30 is a heater over which in operation the foam-coated ply passes and 31 is a hand-operated wheel operatively connected, e.g. by worm and pinion (not shown) to the wheel 32 on which the table is mounted to provide for adjustment of the angle of the table (and hence the angle of the ply) to the longitudinal axis of the mandrel.

33 and 34 are skew rollers adapted to locate the finished tube 35; 36 is an endless belt lapped one or more times round the tube, driven by pulley 37 and tensioned by pulley 38. By means of the endless belt, in operation the spirally wound tube is axially rotated and longitudinally progressed relative to the mandrel, thereby simultaneously drawing the plies round the mandrel and axially progressing the windings along the mandrel. The desired ratio of rotational to longitudinal speed is adjusted by altering the angle at which the belt is fed to the tube. 39 is a trolley mounted on rails 40 and carrying a plug 41 which fits in the end of the tube thereby in operation both supporting and guiding it.

The mandrel 1 is now described in more detail with reference to a preferred embodiment thereof and with the aid of FIGS. 3a and 3b. It comprises a number of hollow cylindrical units 42 slidably mounted on a hollow cantilevered shaft 43 which is rotatably supported by ball races 44 and 45 in mountings 46 and 47, and operably connected to motor 48, e.g. by chain and sprockets. Each of the cylindrical units forming the tail comprises a pair of opposed annular rebated flanged ends 49, arranged with the flanges facing inwardly and adapted to fit on the hollow shaft 43, and a cylindrical wall 50 of perforated construction mounted between, and attached to, each of the flanged ends, e.g. by welding, to form a hollow cylinder. Each flanged end is also drilled at two or more points to receive tie rods 51 by means of which each unit is linked to the flange 52 fixedly mounted on the shaft whereby in operation the units are rotated with the shaft. The units forming the head may be of similar construction to the tail units but have imperforate cylinder walls and are of slightly larger diameter e.g. about 0.01 to 0.05 inch greater. Suitably, the larger diameter units may be formed by fitting impermeable sleeves of suitable thickness over units of the smaller diameter. The interior of the shaft is connected to a conduit 53 which in turn is connected to a source of compressed air not shown. 54 is a valve for controlling the supply of compressed air. Along its length, the shaft is provided with a number of ports 55 connecting the hollow interior thereof to the interior of each tail unit. Each port is preferably provided with means for adjusting its orifice, thereby providing means for establishing a pressure differential along the tail part of the mandrel, if desired.

It will readily be appreciated that by use of this construction, the mandrel may be used in the production of tube of any desired diameter and from any desired materials simply by providing for a number of sets of cylindrical units of the appropriate diameter and by lengthening or shortening the head and/or tail of the mandrel as necessary so as to satisfy the requirement that the tube is supported by the mandrel until the foam is sufficiently set for the tube to be self-supporting.

In operation, a dummy cylinder of substantially the same outside diameter as that of the tube to be formed is placed against the tail of the mandrel, and the lapped belt drive is wrapped round it at the necessary angle to the longitudinal axis of the dummy to provide the desired ratio of rotational to longitudinal movement. Rollers 5 and 6 are positioned in the desired position relative to the mandrel to provide the required angle between the ply 4a and the mandrel and the said ply is drawn off its roll 2a, through the rollers, and over and round the mandrel, and attached to the rear end of the dummy at the appropriate angle predicated by the width of the ply and the diameter of the head of the mandrel. The dummy is then rotated sufficiently to complete a winding of more than 360° of this ply on the mandrel and the adhesive tape is applied along the joint line between the adjacent windings so formed. The table 12 is adjusted to the desired angle to the mandrel and ply 2b is drawn off its roll 2a, through the draw off rollers 8 and 9 and the tension rollers 10 and 11, and along the table under the foam dispensing means, over the heating means, and thence under and around the mandrel and attached to the rear end of the dummy at the appropriate angle. This ply is positioned on the mandrel so that at least part of it is over the tail end of the mandrel, as shown in FIG. 4, so that the tendency for the windings of the first ply to be pressed on to the mandrel by the expansion of the foam is resisted by the air cushion.

The foam dispensing means is adjusted to the desired position along the path of the ply relative to the mandrel to provide the desired amount of foam rise and foam hardening at the point at which the foam reaches the mandrel. This depends on the nature of the foam and the speed at which the foam coated ply is to be drawn past the foam dispenser. Compressed air is supplied to the mandrel at the desired pressure, suitable pressures being in the range of 20 to 60 lbs./sq. in. for most applications and generally about 40 lbs./sq. in. The motor driving the pulley driving the lapped belt, the motor driving the mandrel and the motor driving the draw-off rollers 8, 9 are all started, and, where necessary, the heated is adjusted to the desired heat output. The rotational speed of the mandrel should be at least equal to that of the dummy in order to avoid frictional drag, and the draw off rollers should be operated to withdraw the ply at a speed which is at least equal to the speed at which it is drawn on to the mandrel by the rotation of the dummy. When smooth running has been achieved, the foam dispensing means is put into reciprocating motion across the ply and the foamable composition is supplied to the foam dispenser at a predetermined rate. Preferably, the time lapse between the foamable composition being deposited on the ply and reaching the mandrel, and the amount of heat, if any, supplied to the ply are controlled such that the foam is almost fully expanded before it reaches the mandrel but is at most only partially set. Where the foam is based on a curable plastic composition, the achievement of this may be additionally aided by choice of catalyst or inhibitor for the cure and by suitable choice of the reagents in the curing mixture. Where the foam is based on a thermoplastic composition, on the other hand, the main requirement is that the composition be maintained above the softening point of the thermoplast until it reaches the mandrel so that setting (i.e. solidification) is delayed until the foam is in the annular space between two plies. If desired, heat may be supplied to the tube, e.g. to aid setting of the foam where a curable composition is used.

When the dummy has passed beyond the lapped belt drive, it may be removed and the process continued with the lapped belt driving the spirally wound tube which is supported by the travelling plug.

The advancing spirally wound tube may be cut into suitable lengths, e.g. by a flying saw not shown which travels alongside the tube while performing the cutting operation and then returns quickly to its first position.

If, during the tube forming operation, the ply moves laterally towards one side or other of the support table, the angle of the table relative to the longitudinal axis of the mandrel may be adjusted to restore the ply to its correct position relative to the support table by operating the handwheel 31. Thus, for example, if the ply moves down the tube, the angle between the long axis of the table and the axis of the mandrel is reduced and adjustment continues until the correct relationship between the table and the ply is restored.

Alternatives to the means exemplified will be readily apparent to those skilled in the art. For example, as it is not necessary for the tail of the mandrel to rotate, those units forming the tail may be freely mounted on the shaft. Moreover, the tie rods by which the units are rotated with the shaft may be replaced by other suitable means. For example, the shaft may be provided with an axially extending keyway and one or both of the end pieces of each unit may be provided with keys adapted to fit in said keyway. In another alternative, the cylindrical units mounted on the shaft may be caused to rotate therewith by friction, e.g. by pressing the units against the flange 52 by means of a second flange applying axial pressure at the other end of the shaft by a screw and nut. In yet another alternative, the tail unit or units may be fixedly attached to the shaft which is fixedly mounted in the bearings, and the head portion is rotatably mounted on the shaft and, if desired, driven in any suitable manner.

The perforated walls of the cylinders may be replaced by permeable sintered metal walls.

The rollers 33, 34 for supporting the advancing and rotating tube may be replaced by guide rails and the travelling plug may be replaced by support rails. The guide and support functions may be satisfied by the same rails, if desired.

The lapped belt may be replaced by other drive means.

The reciprocating foam dispensing nozzle may be replaced by a slit orifice of the desired width, or by a nozzle oscillating about a pivot point.

The heating means 30 may be replaced by, or operated in conjunction with, an oven and/or overhead heaters.

The guide means 14, 15, 16 and 17 may be replaced by, for example, guide rails situated within the housing 18.

The process and machinery may be adapted to operate with the mandrel vertical.

The adhesive tape may be replaced by other means for holding together the adjacent helices of the innermost ply, for example a glue dispenser or heat for welding.

Furthermore, although the invention is illustrated with reference to the use of two plies one of which is coated with foam composition; it will be understood that more than two plies may be used if desired and more than one of the plies may be coated with foam composition. Moreover, more than one foam composition may be applied to each ply, if desired, and the compositions may be the same or different.

Materials that may be used for the plies in the process of our invention include, for example, paper, cardboard, textile materials, metal and plastic. Moreover, the plies may be of simple or complex e.g. laminated construction and of simple or complex cross-section, e.g. bearing longitudinal and/or transverse ribs on one or both surfaces. The plies may also be pretreated before use in our process. For example, they may be coated with water-proofing agent, rot-proofing agent, size and adhesive or, in the case of textile material as, for example, glass fibre, they may be impregnated e.g. with a thermosetting resin which may be cured after winding into the form of a tube. The plies may also be printed with any desired legend.

Where a thermoplastic ply is used, e.g. of olefin polymer, vinyl chloride polymer, polyamide or polyester, the ply may be formed in situ by extrusion, if desired.

Reinforcement may be introduced by providing wires, tapes etc., of high modulus material, e.g. steel, glass fibre, synthetic fibre or carbon or graphite fibre, which may be introduced longitudinally into the tube as it is formed and/or spirally wound into or on to it.

The plastic foam compositions are preferably nascent foams based on curable polymer systems, e.g. polyurethane-forming mixtures, phenol-formaldehyde and urea-formaldehyde resins, plastic compositions based on polymerisable vinyl ethers containing at least two polymerisable ethylenically unsaturated groups per molecule, a foaming agent and an acid catalyst, as described for example in British patent specification 991,970, and foams based on polyisocyanurates, e.g. derived from components described in our copending U.S. patent applications Ser. Nos. 543,820 of Apr. 20, 1966, now U.S. 3,516,950, 631,122 of Apr. 17, 1967, 714,037 of Mar. 18, 1968 and 714,036 of Mar. 18, 1968. Foams based on thermoplastics may also be used if desired, in which case the foam dispensing means may conveniently be combined with or connected to an extruder wherein the foam composition is formulated.

Compositions yielding flexible or rigid foams may be used but the latter are preferred.

It is preferred to use the foamable composition as the means for bonding together adjacent helices of the foam-coated ply and/or bonding each foam-coated ply to its adjacent ply but alternative or additional bonding means may be used, if desired.

While the process and machinery of our invention may be used to produce tube of widely varying diameter, wall thickness, and composition, the invention is especially suitable for use in the production of large diameter tubing having a relatively thin wall from very thin ply material, e.g. paper, very thin metal foil, and plastic film.

Another advantage of the process is that by heating or cooling the gas supplied to the gas cushion, further chemical operations on the spirally wound tube may be initiated or aided.

The pipes formed by our process may be used in a wide variety of applications including, for example, sewage, soil pipes, insulation and air-ducting.

What we claim is:

1. A method of forming spirally wound tube having at least one annular layer of foamed plastic which comprises (a) successively supplying tangentially to a mandrel and at an angle of less than 90° to the longitudinal axis thereof (i) a first ply, rotating or lapping said ply around the mandrel to form ply windings thereon and, thereafter, (ii) a second ply bearing a coating of at least one fluid foamable plastic composition which may be in at least partly expanded state, the order of succession and the manner of offering said first and second plies to the mandrel being such that said foamable plastic composition lies between said first and second plies on the mandrel, (b) rotating or lapping said plies round the mandrel to form ply windings thereon and simultaneously axially progressing the resultant ply windings along said mandrel whereby a spirally wound tube is formed, (c) causing or allowing the foam composition to complete its expansion and to set, and (d) supporting the spirally wound tube on the mandrel until the foam is sufficiently set for said tube to be self-supporting.

2. A method as claimed in claim 1 in which each ply is fed on to the mandrel out of register with the previous ply.

3. A method as claimed in claim 1 in which the foamable composition is deposited on the surface of the ply while the surface of said ply is substantially horizontal and said surface is maintained in substantially the horizontal plane while the foam completes some but not all of its expansion and hardening.

4. A method as claimed in claim 1 in which the foamable composition is deposited on the second ply and the coated ply is supplied to the mandrel with the foam in the nip between itself and the previous ply.

5. A method as claimed in claim 1 which comprises rotating or lapping said ply round the mandrel to form ply windings thereon while simultaneously axially progressing the ply windings of said first ply along the mandrel and bonding together axially adjacent windings of said ply to form a spirally wound cover, moving said second ply past foam dispensing means with its surface in a substantially horizontal plane and depositing a layer of fluid foamable plastic composition thereon, causing or allowing the foam to complete some but not all of its expansion and hardening while maintaining said ply surface substantially horizontal, feeding said foam-coated ply tangentially and at an angle of less than 90° to the axis thereof on to the spirally wound structure being formed from the previously wound ply and out of register therewith with the foam in the nip between the plies, rotating or lapping said foam-coated ply round the mandrel at the same rate as the previous ply and axially progressing the windings along the mandrel at the same rate as the previous ply, causing or allowing the foam to complete its expansion and to set and supporting the spirally wound product on the mandrel until the foam is sufficiently hardened for it to be self-supporting.

6. A method as claimed in claim 1 in which the foamable composition is a nascent foam based on a curable polymer system.

7. A method as claimed in claim 1 in which a gas cushion is provided between the mandrel and the ply windings for at least part of the length of the mandrel forward from the tail end thereof.

8. A method as claimed in claim 7 in which the gas cushion is provided for the entire length of the mandrel rearward of a position lying between the point where the nip is formed between the leading edge of the, or the first, foam coated ply and the previous ply or plies and the point where the leading edge of the, or the first, foam coated ply has completed one full revolution about the mandrel.

9. A method as claimed in claim 1 in which the longitudinal tension of at least each ply to be coated with foamable composition is controlled.

10. A method as claimed in claim 9 in which each ply to be coated with foamable composition is positively drawn from its point of supply and fed to the longitudinal tension control means.

11. A method as claimed in claim 1 in which part of the width of the foam coated ply adjacent the leading edge is left substantially uncoated by the foam composition.

References Cited
UNITED STATES PATENTS

| | | | |
|---|---|---|---|
| 3,399,095 | 8/1968 | Hyland, Jr. | 156—79 |
| 3,400,029 | 9/1968 | Mesrobian et al. | 156—425 X |
| 3,388,017 | 6/1968 | Grimsley et al. | 156—203 |

BENJAMIN A. BORCHELT, Primary Examiner

G. E. MONTONE, Assistant Examiner

U.S. Cl. X.R.

156—425; 264—45